(12) United States Patent
Alonso et al.

(10) Patent No.: US 12,621,391 B2
(45) Date of Patent: May 5, 2026

(54) ALTERNATIVE CHARGING HANDLING BASED ON QOS UTILIZING A POLICY CONTROL FUNCTION TO ENFORCE POLICY AND CHARGING CONTROL RULES

(71) Applicant: Telefonaktiebolaget LM Ericsson (publ), Stockholm (SE)

(72) Inventors: Susana Fernandez Alonso, Madrid (ES); Fuencisla Garcia Azorero, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 604 days.

(21) Appl. No.: 17/917,134

(22) PCT Filed: Mar. 18, 2021

(86) PCT No.: PCT/EP2021/057010
§ 371 (c)(1),
(2) Date: Oct. 5, 2022

(87) PCT Pub. No.: WO2021/204514
PCT Pub. Date: Oct. 14, 2021

(65) Prior Publication Data
US 2023/0137509 A1 May 4, 2023

(30) Foreign Application Priority Data
Apr. 8, 2020 (EP) .................................... 20382287

(51) Int. Cl.
*H04M 15/00* (2024.01)
(52) U.S. Cl.
CPC ....... *H04M 15/8016* (2013.01); *H04M 15/66* (2013.01)

(58) Field of Classification Search
CPC ............. H04M 15/8016; H04M 15/66; H04M 15/8055; H04M 15/81; H04M 15/80; H04M 15/8061; H04L 12/1407; H04W 4/24
See application file for complete search history.

(56) References Cited

U.S. PATENT DOCUMENTS

2019/0253917 A1* 8/2019 Dao ...................... H04W 76/27
2020/0092423 A1* 3/2020 Qiao ..................... H04W 80/10
(Continued)

FOREIGN PATENT DOCUMENTS

WO        2019211445 A1    11/2019

OTHER PUBLICATIONS

3GPP, "3GPP TS 23.503 V16.4.1", 3rd Generation Partnership Project; Technical Specification Group Services and System Aspects; Policy and charging control framework for the 5G System (5GS); Stage 2 (Release 16), Apr. 2020, 1-115.
(Continued)

*Primary Examiner* — Pakee Fang
(74) *Attorney, Agent, or Firm* — Murphy, Bilak & Homiller, PLLC

(57) ABSTRACT
A method is performed by a first node, such as a PCF node, of a telecommunication network is provided. The method includes providing an alternative charging profile and an alternative QoS profile to a second node, such as a SMF node, as part of a policy and charging, PCC, rule. The method also includes requesting the second node to apply charging from the PCC rule according to the alternative charging profile based on a QoS degradation. A method performed by a second node also is provided.

27 Claims, 5 Drawing Sheets

(56) References Cited

U.S. PATENT DOCUMENTS

| | | | | |
|---|---|---|---|---|
| 2020/0092424 | A1* | 3/2020 | Qiao .................. | H04L 12/1407 |
| 2021/0058827 | A1* | 2/2021 | Holmström ....... | H04W 28/0263 |
| 2021/0243641 | A1* | 8/2021 | Gangakhedkar ........ | H04L 67/61 |
| 2021/0400146 | A1* | 12/2021 | Muñoz De La Torre Alonso ....... | |
| | | | | H04M 15/66 |
| 2022/0086697 | A1* | 3/2022 | Tamura ................ | H04W 28/24 |

OTHER PUBLICATIONS

3GPP, "3GPP TS 29.512 V16.4.0", 3rd Generation Partnership Project; Technical Specification Group Core Network and Terminals; 5G System; Session Management Policy Control Service; Stage 3 (Release 16), Mar. 2020, 1-186.

3GPP, "3rd Generation Partnership Project; Technical Specification Group Services and System Aspects; Policy and charging control architecture (Release 16)", 3GPP TS 23.203 V16.2.0, Dec. 2019, 267 pages.

3GPP, "3GPP TS 23.501 V16.4.0", 3rd Generation Partnership Project; Technical Specification Group Services and System Aspects; System architecture for the 5G System (5GS); Stage 2 (Release 16), Mar. 2020, 1-430.

Huawei , et al., "Correction on Notification control for GBR QoS flow", 3GPP TSG-SA2 Meeting #126, S2-182744, (revision of S2-181193, 1568), Montreal, Canada, Feb. 26- Mar. 2, 2018, 1-4.

* cited by examiner

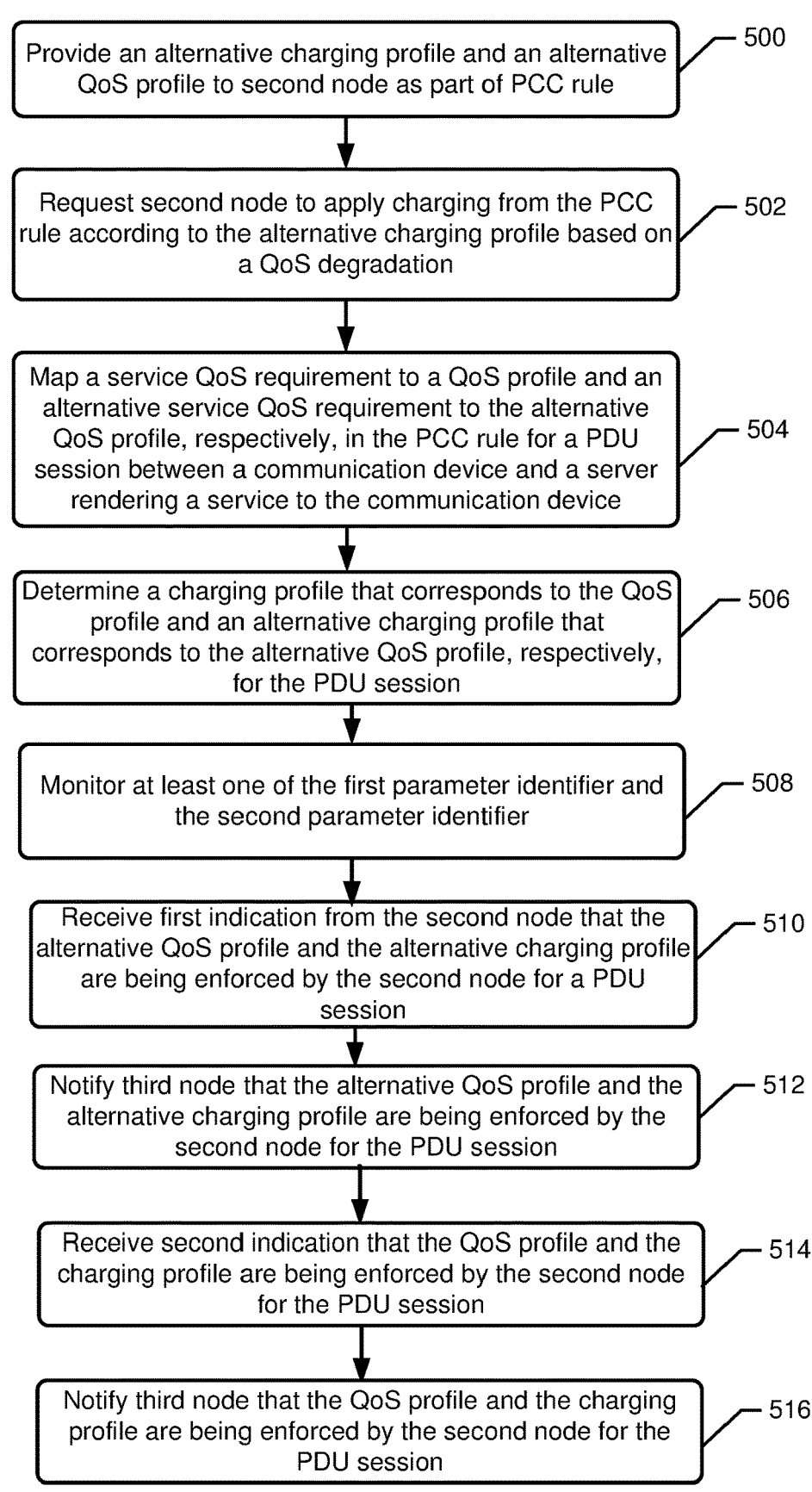

Provide an alternative charging profile and an alternative QoS profile to second node as part of PCC rule — 500

Request second node to apply charging from the PCC rule according to the alternative charging profile based on a QoS degradation — 502

Map a service QoS requirement to a QoS profile and an alternative service QoS requirement to the alternative QoS profile, respectively, in the PCC rule for a PDU session between a communication device and a server rendering a service to the communication device — 504

Determine a charging profile that corresponds to the QoS profile and an alternative charging profile that corresponds to the alternative QoS profile, respectively, for the PDU session — 506

Monitor at least one of the first parameter identifier and the second parameter identifier — 508

Receive first indication from the second node that the alternative QoS profile and the alternative charging profile are being enforced by the second node for a PDU session — 510

Notify third node that the alternative QoS profile and the alternative charging profile are being enforced by the second node for the PDU session — 512

Receive second indication that the QoS profile and the charging profile are being enforced by the second node for the PDU session — 514

Notify third node that the QoS profile and the charging profile are being enforced by the second node for the PDU session — 516

FIGURE 5

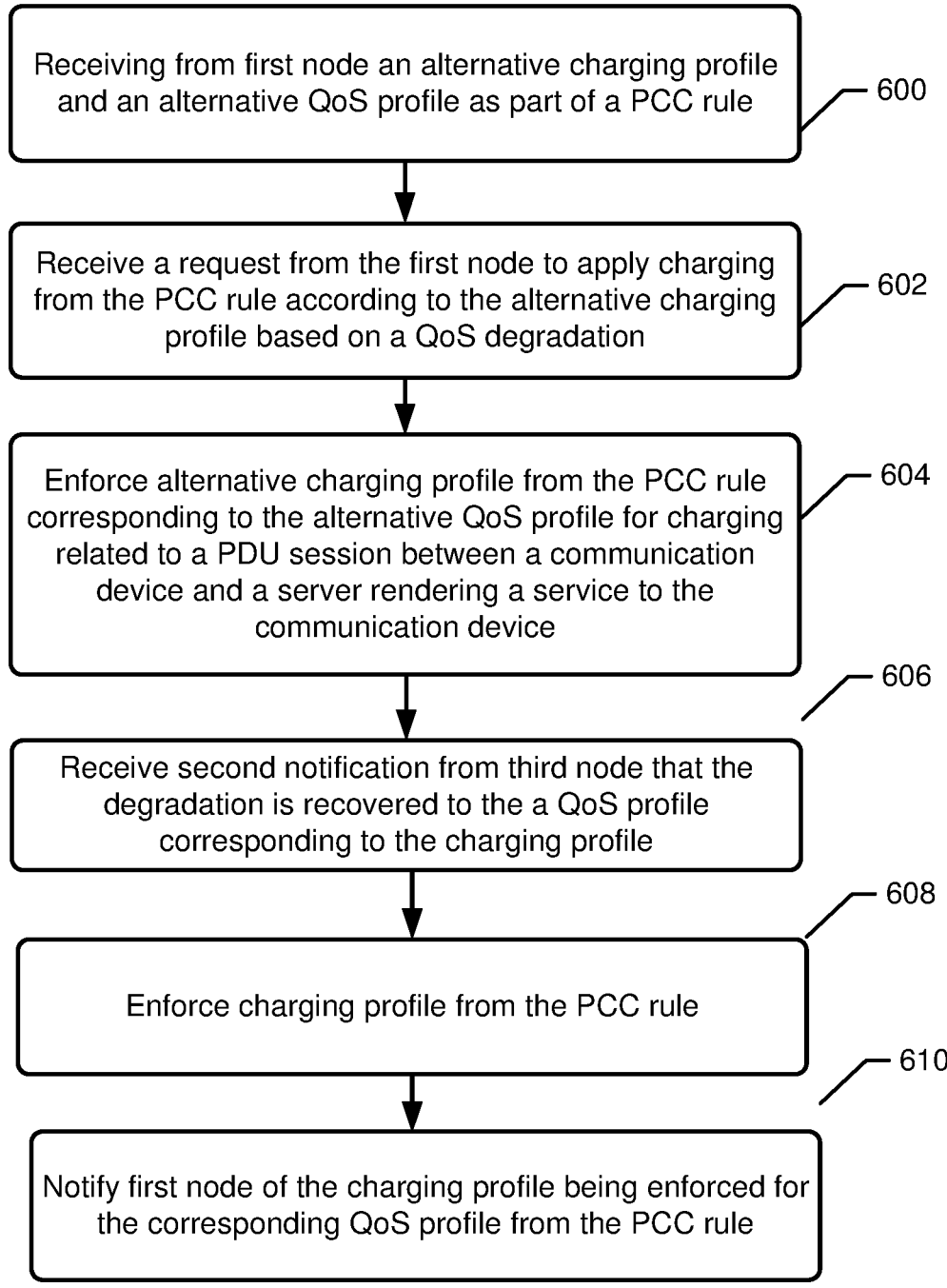

Receiving from first node an alternative charging profile and an alternative QoS profile as part of a PCC rule ⟋— 600

Receive a request from the first node to apply charging from the PCC rule according to the alternative charging profile based on a QoS degradation ⟋— 602

Enforce alternative charging profile from the PCC rule corresponding to the alternative QoS profile for charging related to a PDU session between a communication device and a server rendering a service to the communication device ⟋— 604

⟋— 606

Receive second notification from third node that the degradation is recovered to the a QoS profile corresponding to the charging profile

⟋— 608

Enforce charging profile from the PCC rule

⟋— 610

Notify first node of the charging profile being enforced for the corresponding QoS profile from the PCC rule

FIGURE 6

ALTERNATIVE CHARGING HANDLING BASED ON QOS UTILIZING A POLICY CONTROL FUNCTION TO ENFORCE POLICY AND CHARGING CONTROL RULES

The present disclosure relates generally to communications, and more particularly to communication methods and related devices and nodes supporting wireless communications.

BACKGROUND

3rd Generation Partnership Project (3GPP) defines a Policy and Charging Control (PCC) architecture that allows handling Policy and Charging Control in the network. This architecture is defined in 3GPP TS 23.503 (5th Generation (5G)) or 3GPP TS 23.203 (Evolved Packet Core (EPS)).

For ease of discussion, the description herein is based on 5th Generation Core (5GC) architecture. Other architectures may be used, including without limitation, EPC.

A Policy Control Function (PCF) encompasses policy control decision and flow based charging control functionalities. The PCF provides network control regarding the service data flow detection, gating, quality of service (QoS) and flow based charging (except credit management) towards the Session Management Function (SMF). The PCF receives session and media related information from the Application Function (AF) and informs AF of traffic plane events.

The PCF provisions PCC Rules to the SMF via a N7 reference point. The N7 reference point is defined for the interactions between PCF and SMF in the reference point representation. (See e.g., 3GPP TS 23.503 Rel. 16, p. 21). The PCF informs the SMF through the use of PCC rules on the treatment of each service data flow that is under PCC control, in accordance with the PCF policy decision(s).

The SMF/User Plane Function (UPF) encompasses service data flow detection (based on the filters definitions included in the PCC rules), as well as online and offline charging interactions (not described here) and policy enforcement.

An Application Function (AF) is an element offering applications in which service is delivered in a different layer (i.e. transport layer) from the one the service has been requested (i.e. signaling layer), the control of flow resources according to what has been negotiated. The AF shall communicate with the PCF to transfer dynamic session information (i.e. description of the media to be delivered in the transport layer). This communication is performed using the Rx interface or N5 interface. The N5 reference point is defined for the interactions between PCF and AF in the reference point representation. (See 3GPP TS 23.503 Rel. 16, p. 21).

A Charging Function (CHF) is responsible for converged online charging and offline charging functionalities. It provides quota, re-authorization triggers, rating conditions and is notified about usage reports from the SMF.

SUMMARY

Some embodiments of the present disclosure are directed to a method by a first node of a telecommunication network. In some of said embodiments the first node is a PCF, a second node is a SMF, and a third node is an AF. The method includes providing an alternative charging profile and an alternative QoS profile to a second node, such as a SMF node, as part of a policy and charging, PCC, rule. The method also includes requesting the second node to apply charging from the PCC rule according to the alternative charging profile based on a QoS degradation.

In some of said embodiments, the method further includes mapping a service quality of service, QoS, requirement to a QoS profile and an alternative service QoS requirement to the alternative QoS profile, respectively, in the PCC rule for a protocol data unit, PDU, session between a communication device and a server rendering a service to the communication device. Additionally, the method includes determining a charging profile that corresponds to the QoS profile and an alternative charging profile that corresponds to the alternative QoS profile, respectively, for the PDU session.

In some embodiments, the method performed by a first node, such as a PCF node, further includes monitoring at least one of a first parameter identifier and a second parameter identifier.

In some embodiments, the method performed by the first node further includes receiving a first indication from the second node, such as an SMF node, that the alternative QoS profile and the alternative charging profile are being enforced by the second node for a protocol data unit, PDU, session; and notifying a third node, such as an AF node, that the alternative QoS profile by the second node for the PDU session.

In some of said embodiments, the method performed by the first node further includes receiving a second indication that the QoS profile and the charging profile are being enforced by a second node, such as a SMF node, for the PDU session. The method further includes notifying the third node, such as an AF node, that the QoS profile are being enforced by the second node for the PDU session.

Some other related embodiments are directed to a method by a second node of a telecommunication network. In some of said embodiments a first node is a PCF, the second node is a SMF, and a third node is an AF. The method includes receiving from a first node, such as a PCF node, an alternative charging profile and an alternative quality of service, QoS, profile as part of a policy and charging, PCC, rule. The method also includes receiving a request from the first node to apply charging from the PCC rule according to the alternative charging profile based on a QoS degradation.

In some of said embodiments, the receiving further comprises a request from the first node to apply charging from the PCC rule according to a charging profile based on a QoS recovery.

In some embodiments, the method performed by the second node, such as a SMF node, further includes enforcing the alternative charging profile from the PCC rule corresponding to the alternative QoS profile for charging related to a protocol data unit, PDU, session between a communication device and a server rendering a service to the communication device responsive to receiving a first notification from a third node of the QoS degradation.

In some embodiments, the method performed by the second node, such as a SMF node, further includes notifying the first node of the alternative charging profile being enforced for a corresponding alternative QoS profile. The notifying includes an alternative QoS profile identifier that applies for the PCC rule.

In some of said embodiments, the method performed by the second node, such as a SMF node, further includes receiving a second notification from the third node, i.e. a node in the Radio Access Network, RAN, that the degradation is recovered to the a QoS profile corresponding to the charging profile. The method further includes enforcing the charging profile from the PCC rule responsive to receiving the second notification. In some of said embodiments, the method further includes notifying the first node of the charging profile being enforced for the corresponding QoS profile from the PCC rule. In some of said embodiments, the enforcing the charging profile from the PCC rule, includes informing a charging node, CHF, regarding charging for data of the PDU session using the charging profile.

Further related embodiments are directed to a first node computer program product claims directed to a PCF and a second node apparatuses, such as an SMF.

In some embodiments, a first node, such as a PCF node, of a telecommunication network, includes processing circuitry; and memory coupled with the processing circuitry. The memory includes instructions that when executed by the processing circuitry causes the first node to perform operations including providing an alternative charging profile and an alternative quality of service, QoS, profile to a second node as part of a policy and charging, PCC, rule. The operations performed also include requesting the second node to apply charging from the PCC rule according to the alternative charging profile based on a QoS degradation. In some of said embodiments, the memory includes instructions that when executed by the processing circuitry causes the first node to perform operations according to any of the methods of the first node disclosed herein.

In some embodiments, a second node, such as an SMF node, of a telecommunication network, includes processing circuitry; and memory coupled with the processing circuitry. The memory includes instructions that when executed by the processing circuitry causes the second node to perform operations including receiving from a first node an alternative charging profile and an alternative quality of service, QoS, profile as part of a policy and charging, PCC, rule. The operations performed also include receiving a request from the first node to apply charging from the PCC rule according to the alternative charging profile based on a QoS degradation.

Further related embodiments are directed to computer program products.

In other embodiments, a second node, such as a SMF node, of a telecommunications network, includes processing circuitry and memory coupled with the processing circuitry. The memory includes instructions that when executed by the processing circuitry causes the first node to perform operations including receiving from a first node an alternative charging profile and an alternative quality of service, QoS, profile as part of a policy and charging, PCC, rule. The operations further include receiving a request from the first node to apply charging from the PCC rule according to the alternative charging profile based on a QoS degradation. In some of said embodiments, the memory includes instructions that when executed by the processing circuitry causes the second node to perform operations according to any of the methods of the second node disclosed herein.

In some embodiments, a system for alternative charging handling when a quality of service, QoS, degrades or the QoS recovers during a protocol data unit, PDU, session in a telecommunications network is provided. The system includes a communication device in the PDU session and a server for rendering a service to the communication device during the PDU session between the communication device and the server. The system further includes a first node adapted to perform operations including providing an alternative charging profile and an alternative QoS quality of service, QoS, profile to a second node as part of a policy and charging, PCC, rule. The operations performed further include requesting the second node to apply charging from the PCC rule according to the alternative charging profile based on a QoS degradation. The system further includes a second node for receiving from the first node the alternative charging profile as part of the PCC rule to be enforced by the second node when the second node receives a first notification of a degradation of the QoS in the telecommunication network and for, responsive to receiving the first notification from a RAN, enforcing the alternative charging profile from the PCC rule corresponding to the alternative QoS profile for charging related to the PDU session. In some of said embodiments, the first node is adapted to perform according to any of the methods of the first node disclosed herein.

In some embodiments, there is provided a method of enabling a second node in a telecommunication network to enforce a Policy and Charging Control, PCC, rule, in relation to a Protocol Data Unit, PDU, session between a User Device and the telecommunication network by providing, by a first node in said telecommunication network, Quality-of-Service, QoS, parameters to said second node for use in said PCC rule, said method comprises the steps of receiving, by said first node, service information comprising service QoS requirements and alternative QoS requirements, mapping, by said first node, said received service information into QoS parameter, wherein said QoS parameters at least comprises a QoS profile and is related to a charging profile, and comprises an alternative QoS profile and is related to an alternative charging, wherein said alternative QoS profile and said alternative charging profile is to be used in case of QoS degradation, and providing, by said first node, to said second node, said mapped QoS parameters and related charging parameters for enforcing said PCC rule in relation to said PDU session between said User Device and said telecommunication network.

In some embodiments, there is provided a method of enforcing, by a second node in a telecommunication network, a Policy and Charging Control, PCC, rule, in relation to a Protocol Data Unit, PDU, session between a User Device and the telecommunication network, wherein said method comprises the steps of receiving, by said second node, from a first node in said telecommunication network, QoS parameters and related charging parameters for enforcing said PCC rule in relation to said PDU session between said User Device and said telecommunication network, wherein said QoS and related charging parameters at least comprise a QoS profile and a charging profile bound to said QoS profile, and an alternative QoS provide and an alternative charging profile bound to said alternative QoS profile, wherein said alternative QoS profile and said alternative charging profile is to be used in case of QoS degradation.

In some approaches, a PCF may provide alternative QoS profiles that can be enforced in the radio access network when the provided QoS profile cannot be fulfilled. When that happens, the SMF is informed about the degraded QoS profile and the SMF informs the PCF accordingly. A PCC rule is still active according to the provided values, except for the QoS profile information. In this case, alternative QoS information applies. As a consequence, when, e.g., the QoS profile included in the PCC rule cannot be fulfilled and instead an alternative QoS is applied, the same charging is applied. Thus, the user may perceive a degradation of the service but the user will still be charged according to a satisfactory use of the service. The PCF can modify the charging information in the PCC rule, or other policy decisions (e.g., usage monitoring, traffic control data) when it is notified about the QoS degradation in the network with a QoS notification control trigger. However, when there is, e.g., a tight coupling between the alternative QoS profile being applied and the alternative policy decision to apply (e.g., alternative charging), waiting for the PCF to evaluate the policy decision based on the alternative QoS profile may introduce an unnecessary delay in the actual enforcement in the SMF of the alternative policy decision that corresponds to the alternative QoS.

Potential advantages of various embodiments disclosed herein may include enabling the PCF to make decisions when the QoS profile cannot be guaranteed when the situation is identified without the need for the PCF to provide modified PCC Rules, having a homogeneous behavior for both charging and QoS policies. Other potential advantages of various embodiments disclosed herein may include enabling a second node, such as an SMF node, to apply a charging adjusted to the new network situation when it is informed about the QoS degradation. As a consequence, delay in enforcement in the SMF of the alternative policy decision may be avoided.

Furthermore, other potential advantages of these and other embodiments disclosed herein may include enabling the second node, such as an SMF node, to take future decisions without the need to inform the first node, such as a PCF node, when the situation occurs.

It is noted that aspects described with respect to one embodiment may be incorporated in different embodiments although not specifically described relative thereto. That is, all embodiments and/or features of any embodiments can be combined in any way and/or combination. Moreover, other nodes and corresponding methods and computer program products according to embodiments will be or become apparent to one with skill in the art upon review of the following drawings and detailed description. It is intended that all such other nodes and corresponding methods and computer program products be included within this description and protected by the accompanying claims.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 5 is a flowchart of operations by a first node, such as a PCF node, in accordance with some embodiments of the present disclosure; and FIG. 6 is a flowchart of operations by a second node, such as a SMF node, in accordance with some embodiments of the present disclosure.

DETAILED DESCRIPTION

Figure 1:
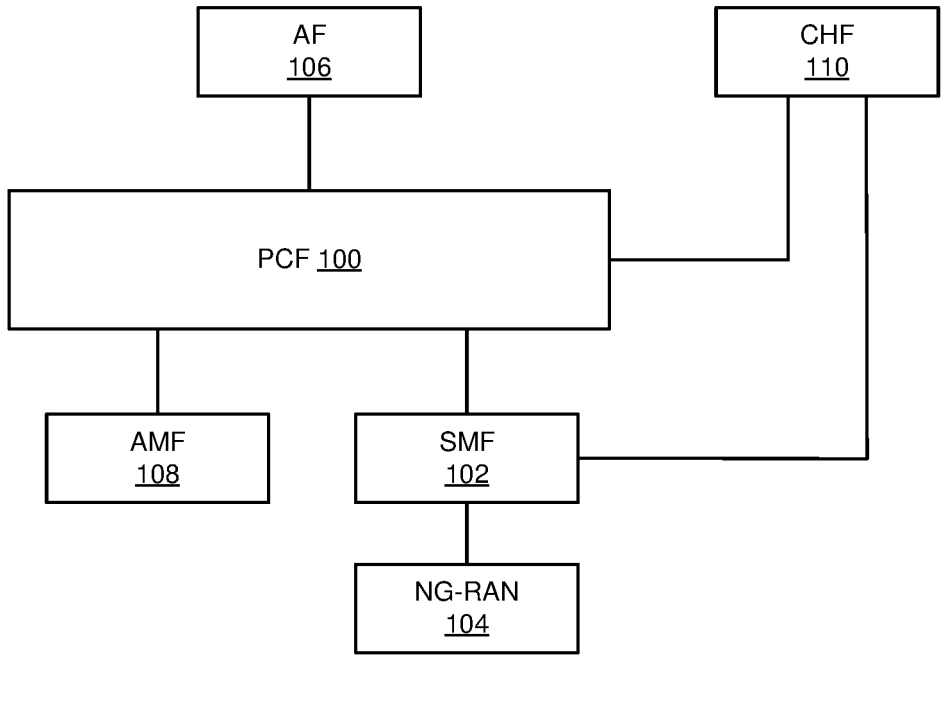
FIG. 1 is a block diagram of a telecommunication network having nodes configured in accordance with some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Alternative QoS handling is now discussed below.

In one approach, as described in 3GPP TS 23.503, Rel. 16 clause 6.1.3.22, the AF may request that a data session to a user equipment (UE) is set up with a specific QoS (e.g. low latency or jitter) and priority handling. The AF may in addition provide Alternative Service Requirements containing one or more QoS reference parameters in a prioritized order (which indicates the preference of the QoS requirements with which the service can operate). If so, the AF shall also subscribe to receive notifications when the QoS targets can no longer (or can again) be fulfilled from the PCF.

When the PCF authorizes the service information from the AF and generates a PCC rule, it shall also derive Alternative QoS parameter sets for this PCC rule based on the QoS reference parameters in the Alternative Service Requirements.

The PCF shall enable QoS Notification Control and include the derived Alternative QoS parameter sets (in the same prioritized order indicated by the AF) in the PCC rule sent to the SMF.

As described in TS 23.501, Rel. 16 clause 5.7.1.2a, if the corresponding PCC rule contains the related information the SMF shall provide, in addition to the QoS profile, a prioritized list of Alternative QoS Profile(s) to the Next-Generation Radio Access Network (NG-RAN).

An Alternative QoS Profile represents a combination of QoS parameters to which the application traffic is able to adapt and has the same format as the QoS profile for that QoS Flow.

When the NG-RAN sends a notification to the SMF that the QoS profile is not fulfilled, the NG-RAN shall, if the currently fulfilled values match an Alternative QoS Profile, also include the reference to the Alternative QoS Profile to indicate the QoS that the NG-RAN currently fulfils. The SMF may notify the PCF about the alternative QoS Profile.

When the PCF notifies the AF that QoS targets can no longer (or can again) be fulfilled (as described in clause 6.1.3.18 in TS 23.503 Rel. 16) the PCF shall include the QoS reference parameter corresponding to the Alternative QoS parameter set referenced by the SMF that is being applied in the RAN.

In embodiments of the present disclosure a first node, a second node, and a third node of a telecommunications network architecture are discussed below. The first node may also be referenced to as a PCF node, the second node may be referenced to as a SMF node, and a third node may be referenced to as an AF node. However, it should be noted that embodiments of the present disclosure are not limited to the kinds of electric nodes and operations performed by the first node, second node, and third node of the telecommunications network architecture.

According to one approach, the PCF provides the SMF with alternative QoS profiles that can be enforced in a Radio Access Network (RAN) when the provided QoS profile cannot be fulfilled.

When that happens, the SMF is informed about the degraded QoS profile and the SMF informs the PCF accordingly. The PCC rule is still active according to the provided values except for the QoS profile information. In this case, the Alternative QoS information applies.

Therefore, according to such an approach, when the QoS included in the PCC Rule cannot be fulfilled and instead an Alternative QoS is being applied, the same charging applies. The user will perceive a degradation of the service but he/she will still be charged according to a satisfactory use of the service.

In such an approach, the PCF modifies the charging information in the PCC rule, or other policy decisions (usage monitoring, traffic control data) when it is notified about the QoS degradation in the network with the QoS Notification Control trigger.

However, when there is a tight coupling between the alternative QoS profile being applied and the alternative policy decision to apply (e.g. alternative Charging), waiting for the PCF to evaluate the policy decision based on the alternative QoS profile may introduce an unnecessary delay in the actual enforcement in the SMF of the alternative policy decision that corresponds to the alternative QoS.

In contrast, various embodiments of the present disclosure allow the PCF to provide the SMF with an alternative charging profile in combination with the alternative QoS profile as part of PCC rule information.

Various embodiments of the present disclosure may enable a first node, e.g. PCF 100, to make proper decisions when the QoS profile cannot be guaranteed when the situation is identified without the need for the PCF 100 to provide modified PCC Rules, thus, having a homogeneous behavior for both charging and QoS policies. Various embodiments of the present disclosure may allow a second node, e.g., SMF 102, to apply a charging adjusted to the new network situation when it is informed about the QoS degradation. Various embodiments of the present disclosure may allow the second node, e.g., SMF 102, to take future decisions without the need to inform the first node, e.g. PCF 100, when the situation occurs.

In some of said embodiments of the present disclosure, a RAN is an NG-RAN. However, embodiments of the present disclosure are not limited to a RAN being an NG-RAN and may include, without limitation, an LTE RAN.

Furthermore, some embodiments of the present disclosure may enable the first node, e.g. PCF 100, to request the second node, e.g. SMF 102, to apply proper or appropriate charging upon a QoS degradation and QoS recovery according to the provided alternative QoS profiles.

In various embodiments of the present disclosure, a QoS degradation may include, without limitation, a level of a QoS target such as a guaranteed bit rate (GBR), a packet delay, and/or a packet rate loss that cannot be guaranteed. A QoS recovery may include, without limitation, after a QoS degradation, a recovery to a level of the QoS target that can be guaranteed, such as a GBR, a packet delay, and/or a packet rate loss.

FIG. 1 is a block diagram of a telecommunication network having nodes configured in accordance with various embodiments of the present disclosure. Referring to FIG. 1, the telecommunication network includes first node 100 (e.g., an PCF node), second node 102 (e.g., an SMF node), NG-RAN 104, application node 106 (e.g., an AF node), Application Management Function (AMF) node 108, and Charging Function (CHF) node 110. The first node 100, second node 102, NG-RAN 104, AF 106, AMF 108, and CHF 110 may be part of the 5G Core Network (5GC).

Figure 3:
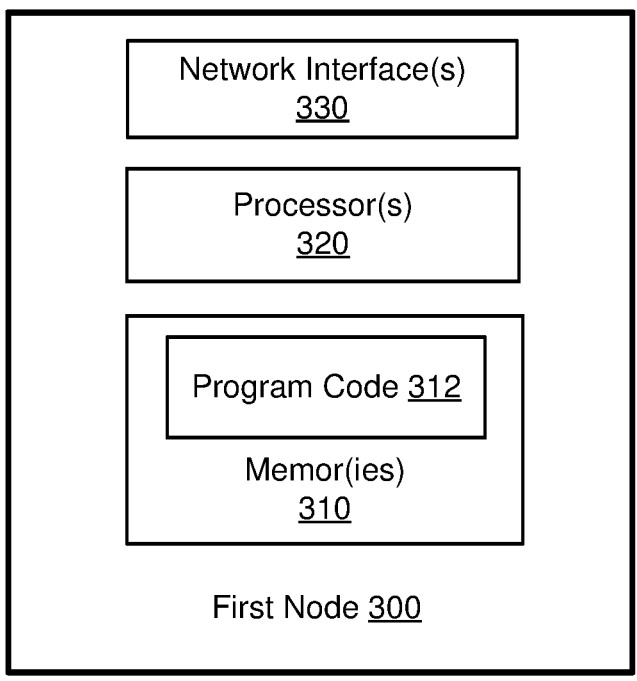
FIG. 3 is a block diagram of a first node of the telecommunications network architecture of FIG. 1, such as a PCF node, containing elements that are configured according to some embodiments of the present disclosure.
Figure 4:
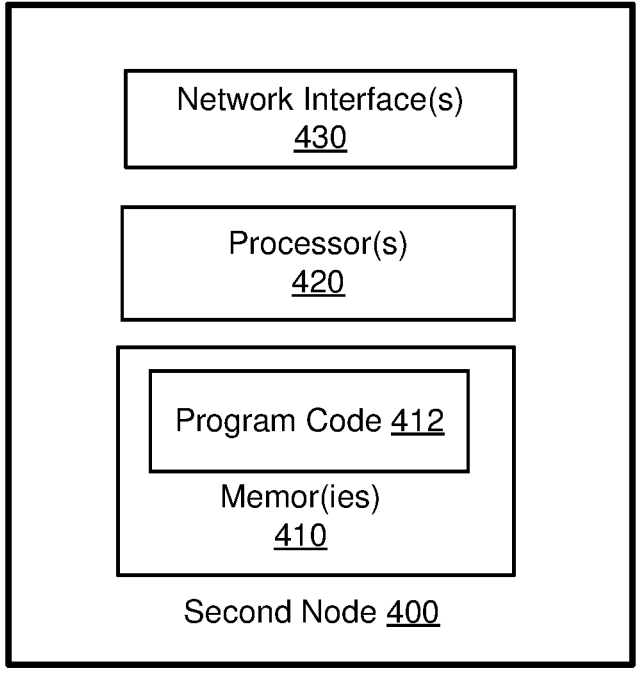
FIG. 4 is a block diagram of a second node of the telecommunications network architecture of FIG. 1, such as a SMF node, containing elements that are configured according to some embodiments of the present disclosure.

While embodiments discussed below are explained in the non-limiting context of first node 100 being a PCF node (also referred to herein as PCF) and second node 102 being a SMF node (also referred to herein as SMF), other nodes performing operations as described herein for PCF 100 and SMF 102 may be used. Moreover, while components of the nodes of the various Figures are depicted in FIGS. 3 and 4 as single boxes located within a larger box, or nested within multiple boxes, in practice, a node may include multiple different physical components that make up a single illustrated component (e.g., a memory may include multiple separate hard drives as well as multiple RAM modules. Additionally, the components may be distributed over multiple locations in the telecommunication network, as described further herein).

Referring to FIG. 1, the PCF 100 encompasses policy control decision and flow based charging control functionalities. The PCF 100 provisions PCC Rules to the SMF 102. The SMF 102 encompasses service data flow detection (based on the filters definitions included in the PCC rules), as well as online and offline charging interactions (not described here) and policy enforcement.

FIG. 5 (discussed further below) is a flowchart of operations by a first node, such as a PCF 100, in accordance with some embodiments of the present disclosure.

FIG. 6 (discussed further below) is a flowchart of operations by a second node, such as a SMF 102, in accordance with some embodiments of the present disclosure.

Referring to FIG. 1, the AF 106 is a node offering applications in which service is delivered in a different layer (e.g., transport layer) from the one the service has been requested (e.g., signaling layer), the control of flow resources according to what has been negotiated. The AF 106 communicates with the PCF 100 to transfer dynamic session information (e.g. description of the media to be delivered in the transport layer).

Referring to FIG. 1, although not shown, a user equipment (UE) communicates with the AMF 108 via a radio access network, which may be a NG-RAN 104.

As used herein, UE refers to a device capable, configured, arranged and/or operable to communicate wirelessly with network nodes and/or other wireless devices. Unless otherwise noted, the term UE may be used interchangeably herein with the terms user equipment (UE) and/or communication device. Communicating wirelessly may involve transmitting and/or receiving wireless signals using electromagnetic waves, radio waves, infrared waves, and/or other types of signals suitable for conveying information through air. In some embodiments, a UE may be configured to transmit and/or receive information without direct human interaction. For instance, a UE may be designed to transmit information to a network on a predetermined schedule, when triggered by an internal or external event, or in response to requests from the radio communication network. Examples of a UE include, but are not limited to, a smart phone, a mobile phone, a cell phone, a voice over IP (VoIP) phone, a wireless local loop phone, a desktop computer, a personal digital assistant (PDA), a wireless camera, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A UE may support device-to-device (D2D) communication, for example by implementing a 3GPP standard for sidelink communication, and may in this case be referred to as a D2D communication device. As yet another specific example, in an Internet of Things (IoT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as a machine-type communication (MTC) device. As one particular example, the UE may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal.

As used herein, node (also referred to herein as a network node) refers to equipment capable, configured, arranged and/or operable to communicate directly or indirectly with a UE and/or with other network nodes or equipment in the radio communication network (also referred to herein as a telecommunication network) to enable and/or provide wireless access to the UE and/or to perform other functions (e.g., administration) in the radio communication network. Examples of network nodes include, but are not limited to, PCF nodes, SMF nodes, AF nodes, access points (APs) (e.g., radio access points), base stations (BSs) (e.g., radio base stations, Node Bs, evolved Node Bs (eNBs), gNode Bs (including, e.g., CU 107 and DUs 105 of a gNode B (gNB), etc.). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay.

A node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a node may be a virtual network node. More generally, however, network nodes may represent any suitable device (or group of devices) capable, configured, arranged, and/or operable to enable and/or provide a UE with access to the telecommunication network or to provide some service to a UE that has accessed the telecommunication network.

Still referring to FIG. 1, an AMF 108 triggers a charging event through a CHF 110 for an International Mobile Subscriber Identity that is included in the attach message to initiate a new charging request for a specific UE. The CHF 110 may be responsible for converged online charging and offline charging functionalities, and provides quota, re-authorization triggers, rating conditions and is notified about usage reports from the SMF 102. The CHF 110 may then periodically report charging to a Billing System, not shown in FIG. 1.

In some embodiments of the present disclosure, the NG-RAN 104 informs the Core Network that the QoS profile cannot be fulfilled and indicates the Alternative QoS that is being fulfilled, in addition to the current behavior, the SMF 102 will check the Alternative Charging Profile that corresponds to the Alternative QoS being applied. Both Alternative QoS Profile and Alternative Charging Profile will be considered as valid information for the active PCC Rule and the SMF 102 will enforce the required actions accordingly.

In some embodiments, an Alternative Charging Profile includes an Alternative Rating Group that would apply and may include other relevant information, such as a charging identifier (ID), a sponsor ID, or application ID, as new sponsor information or kind of reporting level. An Alternative Rating Group includes an identifier of a charging group used to allow the system to know how to charge services. Referring to the flowchart of FIG. 5, in some of embodiments, a method performed by the first node (e.g., 100, 300) of a telecommunication network, such as a PCF 100, includes an alternative charging profile including an alternative rating group and at least one set of alternative charging parameters. The at least one set includes one or more of a charging key, a service identifier, a sponsor identifier, an application service provider identifier, a measurement method, and a service identifier level reporting.

Some embodiments are directed to reverting charging back to the charging profile after the SMF is notified by the RAN that it has reverted back to enforcing the QoS profile. When the SMF 102 is notified that the previously provided QoS information can be guaranteed again, the SMF 102 can notify the PCF 100 according to current procedures and can additionally indicate the Alternative Charging Profile that is being applied. In addition, SMF 102 can reestablish the original values for both QoS and charging in the PCC Rule.

Referring to the flowchart of FIG. 5, in some embodiments, a method performed by the first node (e.g., 100, 300) of a telecommunication network, such as a PCF 100, includes receiving (514) a second indication that the QoS profile and the charging profile are being enforced by a second node, such as a SMF 102, for the PDU session. The method further includes notifying (516) the third node, such as an AF 106, that the QoS profile is being enforced by the second node for the PDU session.

Referring to the flowchart of FIG. 6, in some embodiments, a method performed by the second node (102, 400) of a telecommunication network, such as a SMF 102, includes receiving (606) a second notification from the third node, i.e in the Radio Access Network, RAN, that the degradation is recovered to the a QoS profile corresponding to the charging profile. The method further includes enforcing (608) the charging profile from the PCC rule responsive to receiving the second notification. In some embodiments, the method further includes notifying (610) the first node of the charging profile being enforced for the corresponding QoS profile from the PCC rule. In some embodiments, the enforcing the charging profile from the PCC rule, includes informing a charging node, CHF, regarding charging for data of the PDU session using the charging profile.

Various embodiments of the Alternative Charging Profile will now be discussed. The Alternative Charging Profile may include:

| Alternative Charging Parameter sets | This part defines Alternative Charging Parameter Sets for the service data flow. |
| Charging key | The charging key in this Alternative Charging Parameter Set. |
| Service identifier | The identity of the service or service component the service data flow in a rule relates to. |

-continued

| Sponsor Identifier | The Sponsor Identifier in this Alternative Charging Parameter Set. |
| Application Service Provider Identifier | The Application Service Identifier in this Alternative Charging Parameter Set. |
| Measurement method | The Measurement method in this Alternative Charging Parameter Set. |
| Service Identifier Level Reporting | The service identifier level reporting in this Alternative Charging Parameter Set. |

From the implementation point of view, this information can be sent as a new attribute, e.g. "refAltChargParams" in the PCC rule that can be an array of strings that would refer to the existing (e.g. already provisioned in SMF or being provisioned with current message) charging data.

A table of exemplary charging data within a charging profile is illustrated below:

| Attribute name | Data type | P | Cardinality | Description | Applicability |
|---|---|---|---|---|---|
| flowInfos | array(Flow Information) | C | 1 . . . N | An array of IP flow packet filter information. (NOTE 3) | |
| appId | string | C | 0 . . . 1 | A reference to the application detection filter configured at the UPF. (NOTE 3) | ADC |
| contVer | ContentVersion | O | 0 . . . 1 | Indicates the content version of the PCC rule. | RuleVersioning |
| pccRuleId | string | M | 1 | Univocally identifies the PCC rule within a PDU session. | |
| precedence | Uinteger | O | 0 . . . 1 | Determines the order in which this PCC rule is applied relative to other PCC rules within the same PDU session. It shall be included if the "flowInfos" attribute is included or may be included if the "appId" attribute is included when the PCF initially provisions the PCC rule. (NOTE 2) (NOTE 4) | |
| afSigProtocol | AfSigProtocol | O | 0 . . . 1 | Indicates the protocol used for signalling between the UE and the AF. The default value "NO_INFORMATION" shall apply, if the attribute is not present and has not been supplied previously. | ProvAFsignal Flow |
| appReloc | boolean | O | 0 . . . 1 | It indicates that the application can be relocated once a location of the application is selected by the 5GC when it is included and set to "true". Indication of application relocation possibility. The default value "false" shall apply, if the attribute is not present and has not been supplied previously. | TSC |
| addrPreserInd | boolean | O | 0 . . . 1 | Indicates whether UE IP address should be preserved. This attribute shall set to "true" if preserved, otherwise, set to "false". The default value "false" shall apply, if the attribute is not present and has not been supplied previously. | URLLC |

-continued

| Attribute name | Data type | P | Cardinality | Description | Applicability |
|---|---|---|---|---|---|
| refQosData | array(string) | O | 1 . . . N | A reference to the QoSData policy type decision type. It is the qosId described in subclause 5.6.2.8. (NOTE 1) | |
| refAltQosParams | array(string) | O | 1 . . . N | A Reference to the QoS Data policy decision type for the Alternative QoS parameter sets of the service data flow. Only the "qosId" attribute, "5qi" attribute, "maxbrUl" attribute, "maxbrDl" attribute, "gbrUl" attribute and "gbrDl" attribute are applicable within the QosData data type. This data type represents an ordered list, where the lower the index of the array for a given entry, the higher the priority. | Authorization WithRequired QoS |
| refAltCharg Params | array(string) | O | 1 . . . N | A Reference to the Charging Data policy decision type for the Alternative Charging parameter sets of the service data flow. "appSvdProvId" attribute, "afChargIdentifier" attribute and"afChargId" attribute within the ChargingData data type are not applicable. This data type represents an ordered list that matches with the ordered list under refAltQoSparam data type. | |
| refTcData | array(string) | O | 1 . . . N | A reference to the TrafficControlData policy decision type. It is the tcId described in subclause 5.6.2.10. (NOTE 1) | |
| refChgData | array(string) | O | 1 . . . N | A reference to the ChargingData policy decision type. It is the chgId described in subclause 5.6.2.11. (NOTE 1) | |
| refChgN3gData | array(string) | O | 1 . . . N | A reference to the ChargingData policy decision type only applicable to Non-3GPP access. It is the chgId described in subclause 5.6.2.11. (NOTE 1) (NOTE 5) | ATSSS |
| refUmData | array(string) | O | 1 . . . N | A reference to UsageMonitoringData policy decision type. It is the umId described in subclause 5.6.2.12. (NOTE 1) | |
| refUmN3gData | array(string) | O | 1 . . . N | A reference to UsageMonitoringData policy decision type only applicable to Non-3GPP access. It is the umId described in subclause 5.6.2.12. (NOTE 1) (NOTE 6) | ATSSS |
| refCondData | string | O | 0 . . . 1 | A reference to the condition data. It is the condId described in subclause 5.6.2.9. | |
| refQoSMon | array(string) | O | 1 . . . N | A reference to QoSMonitoringData policy decision type. It is the qsId described in subclause 5.6.2.40. (NOTE 1) | QosMonitoring |
| tscaiInputUl | TscaiInputContainer | O | 0 . . . 1 | Transports TSCAI input parameters for TSC traffic at the ingress interface of the DS-TT/UE (uplink flow direction). | TimeSensitive Networking |

-continued

| Attribute name | Data type | P | Cardinality | Description | Applicability |
|---|---|---|---|---|---|
| tscaiInputDI | TscaiInputContainer | O | 0 . . . 1 | Transports TSCAI input parameters for TSC traffic at the ingress of the NW-TT (downlink flow direction). | TimeSensitive Networking |

Additional information included in the charging data within a charging profile of various embodiments of the present disclosure is italicized in the above table.

In some embodiments, when the SMF 102 is notified from the RAN 104 about whether a QoS target, e.g. guaranteed bit rate (GBR) QoS targets, cannot be guaranteed (and includes the alternative QoS profile that can be enforced) or can be guaranteed again, as per current procedures, the SMF 102 enforces the alternative Charging Profile or the charging data that applies according to whether the RAN 104 is informing about GBR QoS targets not guaranteed and the alternative QoS profile enforced or RAN 104 is informing GBR QoS targets can be guaranteed again. The SMF 102 informs the PCF 100 accordingly, including the Alternative QoS profile identifier that applies for the affected PCC Rule(s).

According to some embodiments of the present disclosure, the alternative charging profile identifier is also be provided to the PCF 100.

In some embodiment of the present disclosure, the QoS-NotificationControlInfo data type of, e.g. 3GPP TS 29.512 Rel. 16, is modified as follows:

From a technical point of view, in the same way that charging policy decisions can be coupled to the alternative QoS profiles enforced by RAN 104, other policy decisions such as alternative traffic control decisions, or alternative QoS monitoring decisions could be coupled to given alternative QoS profiles.

Various embodiments related to alternative charging profile procedures are discussed below.

Figure 2:
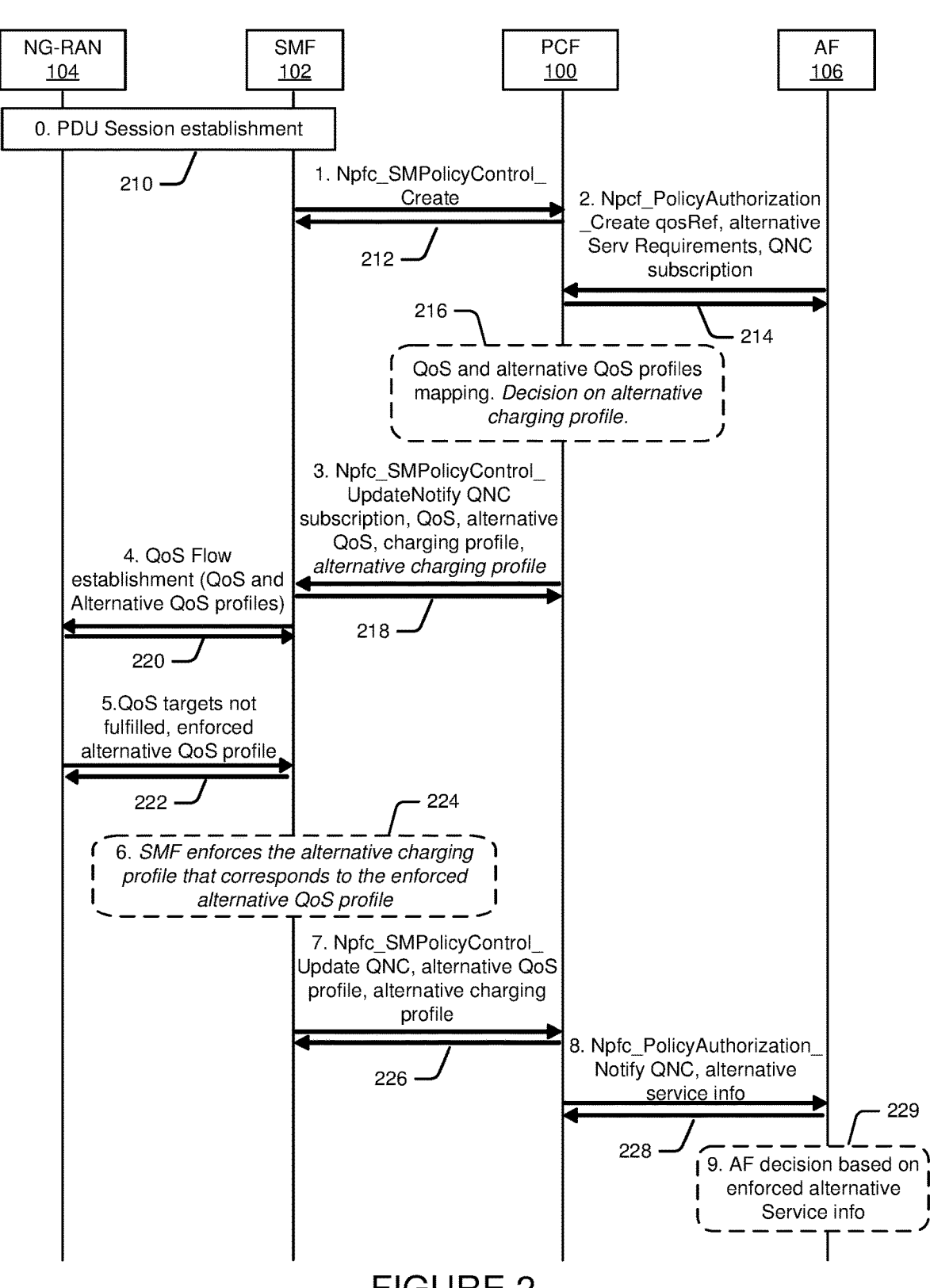
FIG. 2 is a combined data flow diagram and flowchart illustrating a sequence of operations and data flows between nodes of the telecommunication network of FIG. 1 for alternative charging profile procedures for a 5G Core Network architecture in accordance with some embodiments of the present disclosure.

Example operations performed by the nodes of the telecommunication network of FIG. 1 are now explained in the context of the operations shown in FIG. 2 in accordance with some embodiments of the present disclosure.

FIG. 2 is a combined data flow diagram and flowchart illustrating a sequence of operations and data flows between nodes of the telecommunication network of FIG. 1 for alternative charging profile procedures for a 5G Core Network architecture. Although various arrows are used to convey example communication directions, the illustrated arrows are not limiting and the communications can occur in the opposite directions to those illustrated and can occur in both directions.

| Attribute name | Data type | P | Cardinality | Description |
|---|---|---|---|---|
| refPccRuleIds | array(string) | M | 1 . . . N | An array of PCC rule id references to the PCC rules associated with the QosNotificationControlInfo. |
| notifType | QosNotifType | M | 1 | Indicates whether the GBR targets for the indicated SDFs are "NOT_GUARANTEED" or "GUARANTEED" again. |
| contVers | array(Content Version) | C | 1 . . . N | Indicates the version of the PCC rule. If rule versioning feature is supported, the content version shall be included if it was included when the corresponding PCC rule was installed or modified. |
| altQosParamId | string | O | 0 . . . 1 | Indicates the alternative QoS parameter set the NG-RAN can guarantee. |
| altChargParamId | string | O | 0 . . . 1 | Indicates the alternative Charging parameter set that the SMF is enforcing. |

The above table illustrates definitions of types of QosNotificationControlInfo. Additional attributes of various embodiments of the present disclosure in the above table are italicized.

Providing an Alternative Charging Parameter Id can be omitted if the PCF 100 keeps the relationship with the related altQoSParamId. It is however useful to avoid desynchronization if this relationship is modified or could vary depending on dynamic conditions or operator conditions (e.g., for there might be 3 different alternative Charging profile to apply based on time of day conditions for the same alternative QoS profile).

This information may also be useful to simplify the statistics monitoring and other analytics cases where both data are relevant.

The flow illustrated in FIG. 2 represents the provisioning of alternative service requirements from the AF 106, the PCF 100 mapping to alternative QoS data and alternative Charging profile data and the enforcement and notification of the alternative QoS data and alternative Charging data when QoS targets, e.g., GBR targets, cannot be guaranteed by the Non-Access-Stratum (NAS).

The following is an exemplary embodiment showing how the embodiment may be applied to the procedure illustrated in FIG. 2, with aspects according to various embodiment of the present disclosure italicized in FIG. 2. Turning to FIG. 2, operations the first node, such as a PCF 100, a second node, such as a SMF 102, and other network equipment perform are illustrated below:

1. At PDU session establishment 210, the SMF 102 requests PCC rules to the PCF 100 using the Npcf_SMPolicyControl_Create service operation 212.

2. After UE service invocation, the AF 106 invokes the Npcf_PolicyAuthorization_Create service operation to request the PCF 100 the reservation of access network resources according to the indicated service information 214. In this exemplary use case, this includes: Service QoS requirements, alternative service QoS requirements and a subscription to QoS Notification Control trigger, to be notified about when the required QoS targets are not guaranteed or guaranteed again. These operations are discussed in more detail below.

3. PCF 100 performs AF 106 session binding to PDU session/SM Policy context and maps the received service QoS requirements into QoS profiles, and maps the received alternative QoS requirements into alternative QoS data profiles 216. The mapping can be performed using a mapping table. For example, the mapping table can include alternative QoS requirements for low quality, medium quality and premium quality, respectively. PCF 100 can map each of the alternative QoS requirements into alternative QoS data profiles, respectively, and derives an applicable charging key for each alternative in the alternative charging profile 216.

For example, in various embodiments, the PCF 100 derives the charging profile that corresponds to the corresponding QoS profile and the alternative charging profile to the corresponding alternative QoS profile. The PCF 100 provisions this information to the SMF together with the subscription to the QNC trigger. In other words, the SMF 102 checks for the specific requirements related to the PDU session. Then the SMF 102 checks the PCC rule (alternative QoS profile) for that service and gets the alternative charging profile for this PCC rule. These operations are discussed in more detail below.

4. SMF 102 performs PDU session modification to create a QoS flow 220 for the traffic of the provisioned PCC rule. Received QoS and alternative QoS is bound to the created QoS flow.

5. At some point, the RAN, such as a NG-RAN, 104 runs in a condition where the required QoS targets cannot be guaranteed, but the QoS targets described in one of the alternative QoS profiles can be used. The NG-RAN 104 notifies 222 so to the SMF 102, indicating QoS targets are not guaranteed but QoS targets of the notified alternative QoS profile can be used.

6. The SMF 102, at the reception of the notification from the NG-RAN 104, enforces 224 the alternative charging profile that corresponds with the notified alternative QoS profile. To enforce the alternative charging profile, the SMF 102 applies this alternative charging profile instead of the previous one when informing the CHF 110 about the packets that are applicable for a certain rating group. These operations are discussed in more detail below.

7. The SMF 102 notifies 226 the PCF 100 about QoS targets not guaranteed and includes the alternative QoS profile that can be guaranteed and the alternative Charging profile that is being applied. These operations are discussed in more detail below.

8. The PCF 100 notifies 228 the AF 106 that the service QoS targets cannot be guaranteed and indicates the alternative service requirements being applied. These operations are discussed in more detail below.

9. The AF takes 229 the corresponding actions, as e.g., codec adaptation with the UE for a suitable information of the representation according to the access network guaranteed QoS.

Referring the flowchart of FIG. 5, the above operation 2 is discussed further below.

In some embodiments, a QNC report includes a first parameter identifier for a parameter from an alternative QoS set of parameters that the telecommunication network can guarantee and a second parameter identifier for a parameter from an alternative charging parameter set that the second node is enforcing or an indication of a QoS recovery.

In some embodiments, a method performed by a first node (e.g., 100, 300), such as a PCF 100, of a telecommunication network includes monitoring (508) at least one of the first parameter identifier and the second parameter identifier.

Referring the flowchart of FIG. 5, the above operation 3 is discussed further below.

In some embodiments, a method is performed by a first node (100, 300), such as a PCF 100, of a telecommunication network. The method includes providing (500) an alternative charging profile and an alternative QoS profile to a second node (102, 300), such as a SMF 102, as part of a policy and charging, PCC, rule. The method also includes requesting (502) the second node to apply charging from the PCC rule according to the alternative charging profile based on a QoS degradation.

In some of said embodiments, the providing (500) further comprises provision to the second node of the service QoS profile, the alternative QoS profile, the charging profile, the alternative charging profile, and a subscription to a QoS notification control, QNC, report for applying charging according to the alternative charging profile or the charging profile In some of said embodiments, the requesting (502) further includes requesting the second node to apply charging from the PCC rule according to a charging profile based on a QoS recovery.

In some of said embodiments, the method further includes mapping (504) a service quality of service, QoS, requirement to a QoS profile and an alternative service QoS requirement to the alternative QoS profile, respectively, in the PCC rule for a protocol data unit, PDU, session between a communication device and a server rendering a service to the communication device. Additionally, the method includes determining (506) a charging profile that corresponds to the QoS profile and an alternative charging profile that corresponds to the alternative QoS profile, respectively, for the PDU session.

In some of said embodiments, the PCC rule includes a reference to a charging data policy decision type for the alternative charging profile and the charging profile, respectively.

Referring the flowchart of FIG. 6, the above operation 3 is discussed further below.

In some embodiments, a method is performed by a second node (102, 300), such as a SMF 102, of a telecommunication network. The method includes receiving (600) from a first node, such as a PCF 100, an alternative charging profile and an alternative quality of service, QoS, profile as part of a policy and charging, PCC, rule. The method also includes receiving (602) a request from the first node to apply charging from the PCC rule according to the alternative charging profile based on a QoS degradation.

In some of said embodiments, the receiving (602) further includes a request from the first node to apply charging from the PCC rule according to a charging profile based on a QoS recovery.

Referring the flowchart of FIG. 6, the above operation 6 is discussed further below.

In some embodiments, the method performed by the second node (102, 300), such as the SMF 102, further includes enforcing (604) the alternative charging profile from the PCC rule corresponding to the alternative QoS profile for charging related to a protocol data unit, PDU, session between a communication device and a server rendering a service to the communication device responsive to receiving a first notification from a third node of the QoS degradation.

In some of said embodiments, the enforcing (604) of the alternative charging profile from the PCC rule corresponding to the alternative QoS profile for charging related to the PDU session, includes informing a charging node, CHF, regarding charging for data of the PDU session using the alternative charging profile.

In some of said embodiments, the receiving further includes a QoS profile, the alternative QoS profile, a charging profile corresponding to the QoS profile, and a subscription to a QoS notification control, QNC, report for applying charging according to the alternative charging profile or the charging profile.

Referring the flowchart of FIG. 6, the above operation 7 is discussed further below.

In some embodiments, the method performed by the second node (102, 300), such as the SMF 102, further includes notifying the first node of the alternative charging profile being enforced for a corresponding alternative QoS profile, wherein the notifying includes an alternative QoS profile identifier that applies for the PCC rule.

In some of said embodiments, the notifying further includes an alternative charging profile identifier.

Referring the flowchart of FIG. 5, the above operations 7 and 8 are discussed further below.

In some embodiments, the method performed by a first node (e.g., 100, 300), such as a PCF 100, includes receiving (510) a first indication from the second node, such as an SMF 102, that the alternative QoS profile and the alternative charging profile are being enforced by the second node for a protocol data unit, PDU, session and notifying (512) a third node, such as an AF 106, that the alternative QoS profile is being enforced by the second node for the PDU session.

Various operations from the flowchart of FIG. 5 may be optional with respect to some embodiments of first nodes and related methods. Regarding methods of example embodiments 3, 7, 9, and 10 below, for example, operations of blocks 504-516 of FIG. 5 may be optional.

Referring to the flowchart of FIG. 6, in some embodiments, the alternative charging profile comprises an alternative rating group and at least one set of alternative charging parameters, wherein the at least one set comprises one or more of a charging key, a service identifier, a sponsor identifier, an application service provider identifier, a measurement method, and a service identifier level reporting.

In further reference to the flowchart of FIG. 6, in some embodiments, the PCC rule comprises a reference to a charging data policy decision type for the alternative charging profile and the charging profile, respectively.

Various operations from the flowchart of FIG. 6 may be optional with respect to some embodiments of first nodes and related methods. Regarding methods of example embodiments 14, 19, and 20 below, for example, operations of blocks 604-610 of FIG. 6 may be optional.

In some embodiments, a computer program product comprising a non-transitory computer readable medium storing program code executable by a second node to perform the methods of any of the first node or second node.

FIG. 3 is a block diagram of a first node 300 of the telecommunication network architecture of FIG. 1, such as the PCF 100, containing elements that are configured according to some embodiments. The electronic node 300 can include one or more network interfaces 330 (referred to as "network interface" for brevity), one or more processors 320 (referred to as "processor" for brevity), and one or more memories 310 (referred to as "memory" for brevity) containing program code 312.

One or more processors 320 may control network interface 330 to transmit communications through network interface 330 to one or more other nodes and/or to receive communications through network interface 330 from one or more other nodes. The processor 320 may include one or more data processing circuits, such as a general purpose and/or special purpose processor (e.g., microprocessor and/or digital signal processor) that may be collocated or distributed across one or more networks. The processor 320 is configured to execute program code 312 in the memory 310, described below as a computer readable medium, to perform some or all of the operations and methods that are described above for one or more of the embodiments of a first node (e.g., PCF 100).

FIG. 4 is a block diagram of an electronic node 400 of the telecommunication network architecture of FIG. 1, such as the SMF 102 containing elements that are configured according to some embodiments. The electronic node 400 can include one or more network interfaces 430 (referred to as "network interface" for brevity), one or more processors 420 (referred to as "processor" for brevity), and one or more memories 410 (referred to as "memory" for brevity) containing program code 412.

One or more processors 420 may control network interface 430 to transmit communications through network interface 430 to one or more other nodes and/or to receive communications through network interface 430 from one or more other nodes. The processor 420 may include one or more data processing circuits, such as a general purpose and/or special purpose processor (e.g., microprocessor and/or digital signal processor) that may be collocated or distributed across one or more networks. The processor 420 is configured to execute program code 412 in the memory 410, described below as a computer readable medium, to perform some or all of the operations and methods that are described above for one or more of the embodiments of a second node (e.g., SMF 102).

Referring to FIG. 3, in some embodiments, a first node (e.g., 100, 300), such as a PCF 100, of a telecommunication network, includes processing circuitry (320) and memory (310) coupled with the processing circuitry. The memory includes instructions that when executed by the processing circuitry causes the first node to perform operations including providing an alternative charging profile and an alternative quality of service, QoS, profile to a second node as part of a policy and charging, PCC, rule. The operations performed also include requesting the second node to apply charging from the PCC rule according to the alternative charging profile based on a QoS degradation. In some of said embodiments, the memory includes instructions that when executed by the processing circuitry causes the first node to perform operations according to any of the methods of the first node disclosed herein.

Referring to FIG. 4, in some embodiments, a second node (e.g., 102, 400), such as a SMF 102, of a telecommunications network, includes processing circuitry (420) and memory (410) coupled with the processing circuitry. The memory includes instructions that when executed by the processing circuitry causes the first node to perform operations including receiving from a first node an alternative charging profile and an alternative quality of service, QoS, profile as part of a policy and charging, PCC, rule. The operations further include receiving a request from the first node to apply charging from the PCC rule according to the alternative charging profile based on a QoS degradation. In some of said embodiments, the memory includes instructions that when executed by the processing circuitry causes the second node to perform operations according to any of the methods of the second node disclosed herein.

In other embodiments, a first node (e.g., 100, 300), such as a PCF 100, of a telecommunications network is adapted to perform operations including providing an alternative charging profile and an alternative quality of service, QoS, profile to a second node as part of a policy and charging, PCC, rule. The operations performed further include requesting the second node to apply charging from the PCC rule according to the alternative charging profile based on a QoS degradation. In some of said embodiments, the first node (e.g., 100, 300) is adapted to perform according to any of the methods of the first node disclosed herein.

In other embodiments, a second node (e.g., 100, 400), such as a SMF 102, of a telecommunications network is adapted to perform operations including receiving from a first node an alternative charging profile and an alternative quality of service, QoS, profile as part of a policy and charging, PCC, rule. Operations performed further include receiving a request from the first node to apply charging from the PCC rule according to the alternative charging profile based on a QoS degradation. In some of said embodiments, the second node (e.g., 102, 400) is adapted to perform according to any of the methods of the second node disclosed herein.

In some embodiments, a system for alternative charging handling when a quality of service, QoS, degrades or the QoS recovers during a protocol data unit, PDU, session in a telecommunications network is provided. The system includes a communication device in the PDU session. The system also includes a server for rendering a service to the communication device during the PDU session between the communication device and the server. The system further includes a first node for providing an alternative charging profile and an alternative QoS profile to a second node as part of a policy and charging, PCC, rule, and for requesting the second node to apply charging from the PCC rule according to the alternative charging profile based on a QoS degradation. The system also includes a second node for receiving from the first node the alternative charging profile as part of the PCC rule to be enforced by the second node when the second node receives a first notification of a degradation of the QoS in the telecommunication network and for, responsive to receiving the first notification from a third node in the RAN, enforcing the alternative charging profile from the PCC rule corresponding to the alternative QoS profile for charging related to the PDU session. In some of said embodiments, the first node is according to any of operations performed by the apparatus and program product of the first node. In some of said embodiments, the second node is according to any of operations performed by the apparatus and program product of the second node.

Various embodiments of the present disclosure include provisioning of an alternative charging profile to be enforced by the second node (e.g., SMF node 102) when the second node is notified about a degradation of the QoS in the network.

Some embodiments of the present disclosure include reestablishing the original charging values in the second node (e.g., SMF node 102) when the second node is notified that the degradation is recovered.

Some embodiments of the present disclosure include notification to the first node (e.g., PCF node 100) of the alternative charging profile that is being applied for the corresponding alternative QoS profile.

Aspects of the present disclosure have been described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but the description is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Example embodiments are provided below. Reference numbers/letters are provided in parenthesis by way of example/illustration without limiting example embodiments to particular elements indicated by reference numbers/letters:

Listing of Embodiments

1. A method performed by a first node (100, 300) of a telecommunication network, the method comprising:
    providing (500) an alternative charging profile and an alternative quality of service, QoS, profile to a second node as part of a policy and charging, PCC, rule; and
    requesting (502) the second node to apply charging from the PCC rule according to the alternative charging profile based on a QoS degradation.

2. The method of Embodiment 1, wherein the requesting (502) further comprises requesting the second node to apply charging from the PCC rule according to a charging profile based on a QoS recovery.

3. The method of any of Embodiments 1 to 2, further comprising:
    mapping (504) a service quality of service, QoS, requirement to a QoS profile and an alternative service QoS requirement to the alternative QoS profile, respectively, in the PCC rule for a protocol data unit, PDU, session between a communication device and a server rendering a service to the communication device;
    determining (506) a charging profile that corresponds to the QoS profile and an alternative charging profile that corresponds to the alternative QoS profile, respectively, for the PDU session.

4. The method of any of Embodiments 1 to 3, wherein the providing further comprises provision to the second node of the service QoS profile, the alternative QoS profile, the charging profile, the alternative charging profile, and a subscription to a QoS notification control, QNC, report for applying charging according to the alternative charging profile or the charging profile.

5. The method of any of Embodiments 1 to 4, wherein the alternative charging profile comprises an alternative rating group and at least one set of alternative charging parameters, wherein the at least one set comprises one or more of a charging key, a service identifier, a sponsor identifier, an application service provider identifier, a measurement method, and a service identifier level reporting.

6. The method of any of Embodiments 1 to 5, wherein the QNC report comprises a first parameter identifier for a parameter from an alternative QoS set of parameters that the telecommunication network can guarantee and a second parameter identifier for a parameter from an alternative charging parameter set that the second node is enforcing or an indication of a QoS recovery.

7. The method of Embodiments 6, further comprising:
    monitoring (508) at least one of the first parameter identifier and the second parameter identifier.

8. The method of any of Embodiments 1 to 7, wherein the PCC rule comprises a reference to a charging data policy decision type for the alternative charging profile and the charging profile, respectively.

9. The method of any of Embodiments 1 to 8, further comprising:
    receiving (510) a first indication from the second node that the alternative QoS profile and the alternative charging profile are being enforced by the second node fora protocol data unit, PDU, session; and
    notifying (512) a third node that the alternative QoS profile and the alternative charging profile are being enforced by the second node for the PDU session.

10. The method of Embodiments 9, further comprising:
    receiving (514) a second indication that the QoS profile and the charging profile are being enforced by the second node for the PDU session; and
    notifying (516) the third node that the QoS profile and the charging profile are being enforced by the second node for the PDU session.

11. A computer program product comprising a non-transitory computer readable medium storing program code executable by a first node to perform the method of any of Embodiments 1 to 10.

12. A method performed by a second node (102, 400) of a telecommunication network, the method comprising:
    receiving (600) from a first node an alternative charging profile and an alternative quality of service, QoS, profile as part of a policy and charging, PCC, rule; and receiving (602) a request from the first node to apply charging from the PCC rule according to the alternative charging profile based on a QoS degradation.

13. The method of Embodiment 12, wherein the receiving (602) further comprises a request from the first node to apply charging from the PCC rule according to a charging profile based on a QoS recovery.

14. The method of any of Embodiments 12 to 13, further comprising:

responsive to receiving a first notification from a third node in the RAN of the QoS degradation, enforcing (604) the alternative charging profile from the PCC rule corresponding to the alternative QoS profile for charging related to a protocol data unit, PDU, session between a communication device and a server rendering a service to the communication device.

15. The method of Embodiment 15, wherein the enforcing (604) of the alternative charging profile from the PCC rule corresponding to the alternative QoS profile for charging related to the PDU session, comprises:

informing a charging node, CHF, regarding charging for data of the PDU session using the alternative charging profile.

16. The method of any of Embodiments 12 to 15, further comprising:

notifying the first node of the alternative charging profile being enforced for a corresponding alternative QoS profile, wherein the notifying includes an alternative QoS profile identifier that applies for the PCC rule.

17. The method of Embodiment 16, wherein the notifying further includes an alternative charging profile identifier.

18. The method of any of Embodiments 12 to 17, wherein the receiving further includes a QoS profile, the alternative QoS profile, a charging profile corresponding to the QoS profile, and a subscription to a QoS notification control, QNC, report for applying charging according to the alternative charging profile or the charging profile.

19. The method of any of Embodiments 12 to 18, further comprising:

receiving (606) a second notification from the third node in the RAN that the degradation is recovered to the a QoS profile corresponding to the charging profile; and responsive to receiving the second notification, enforcing (608) the charging profile from the PCC rule.

20. The method of Embodiment 19, further comprising:

notifying (610) the first node of the charging profile being enforced for the corresponding QoS profile from the PCC rule.

21. The method of any of Embodiments 19 to 20, wherein the enforcing the charging profile from the PCC rule, comprises:

informing a charging node, CHF, regarding charging for data of the PDU session using the charging profile.

22. The method of any of Embodiments 12 to 21, wherein the alternative charging profile comprises an alternative rating group and at least one set of alternative charging parameters, wherein the at least one set comprises one or more of a charging key, a service identifier, a sponsor identifier, an application service provider identifier, a measurement method, and a service identifier level reporting.

23. The method of any of Embodiments 18 to 22, wherein the QNC report comprises a first parameter identifier for a parameter from an alternative QoS set of parameters that the telecommunication network can guarantee and a second parameter identifier for a parameter from an alternative charging parameter set that the second node is enforcing.

24. The method of any of Embodiments 12 to 23, wherein the PCC rule comprises a reference to a charging data policy decision type for the alternative charging profile and the charging profile, respectively.

25. A computer program product comprising a non-transitory computer readable medium storing program code executable by a second node to perform the method of any of Embodiments 12 to 24.

26. A first node (100, 300) of a telecommunication network, the first node comprising:

processing circuitry (320); and memory (310) coupled with the processing circuitry, wherein the memory includes instructions that when executed by the processing circuitry causes the first node to perform operations comprising:

providing an alternative charging profile and an alternative quality of service, QoS, profile to a second node as part of a policy and charging, PCC, rule; and requesting the second node to apply charging from the PCC rule according to the alternative charging profile based on a QoS degradation.

27. The first node of Embodiment 236, wherein the memory includes instructions that when executed by the processing circuitry causes the first node to perform operations according to any of Embodiments 2-10.

28. A first node (100, 300) of a telecommunications network adapted to perform operations comprising:

providing an alternative charging profile and an alternative quality of service, QoS, profile to a second node as part of a policy and charging, PCC, rule; and requesting the second node to apply charging from the PCC rule according to the alternative charging profile based on a QoS degradation.

29. The first node of Embodiment 28 adapted to perform according to any of Embodiments 2-10.

30. A second node (102, 400) of a telecommunications network, the second node comprising:

processing circuitry (420); and memory (410) coupled with the processing circuitry, wherein the memory includes instructions that when executed by the processing circuitry causes the first node to perform operations comprising:

receiving from a first node an alternative charging profile and an alternative quality of service, QoS, profile as part of a policy and charging, PCC, rule; and receiving a request from the first node to apply charging from the PCC rule according to the alternative charging profile based on a QoS degradation.

31. The second node of Embodiment 30, wherein the memory includes instructions that when executed by the processing circuitry causes the second node to perform operations according to any of Embodiments 12-24.

32. A second node of a telecommunications network adapted to perform operations comprising:

receiving from a first node an alternative charging profile and an alternative quality of service, QoS, profile as part of a policy and charging, PCC, rule; and receiving a request from the first node to apply charging from the PCC rule according to the alternative charging profile based on a QoS degradation.

33. The second node of Embodiment 32 adapted to perform according to any of Embodiments 12-24.

34. A system for alternative charging handling when a quality of service, QoS, degrades or the QoS recovers during a protocol data unit, PDU, session in a telecommunications network, the system comprising:

a communication device in the PDU session;

a server for rendering a service to the communication device during the PDU session between the communication device and the server;

a first node for providing an alternative charging profile and an alternative QoS profile to a second node as part of a policy and charging, PCC, rule, and for requesting the second node to apply charging from the PCC rule according to the alternative charging profile based on a QoS degradation; and a second node for receiving from the first node the alternative charging profile as part of the PCC rule to be enforced by the second node when the second node receives a first notification of a degradation of the QoS in the telecommunication network and for, responsive to receiving the first notification from a third node in the RAN, enforcing the alternative charging profile from the PCC rule corresponding to the alternative QoS profile for charging related to the PDU session.

35. The system of Embodiment 34, wherein the first node is according to any of Embodiments 26 to 29.

36. The system of any of Embodiments 34 to 35, wherein the second node is according to any of Embodiments 30 to 33.

References are identified below.

[1] 3GPP TS 23.503 Rel 16.

[2] 3GPP TS 29.512 Rel 16.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

Various abbreviations used herein include the following:

| Abbreviation | Explanation |
|---|---|
| 3GPP | 3rd Generation Partnership Project |
| 5G | 5th Generation |
| 5GC | 5th Generation Core |
| AF | Application Function |
| AMF | Access Management Function |
| CHF | Charging Function |
| GBR | Guaranteed Bit Rate |
| NAS | Non-Access-Stratum |
| NG-RAN | Next-Generation Radio Access Network |
| PCC | Policy and Charging Control |
| PCF | Policy Control Function |
| PDU | Protocol Data Unit |
| QoS | Quality of Service |
| RAN | Radio Access Network |
| SMF | Session Management Function |
| UE | User Equipment |
| UPF | User Plane Function |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/ operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Claims are provided below. Reference numbers/letters are provided in parenthesis by way of example/illustration without limiting example embodiments to particular elements indicated by reference numbers/letters.

The invention claimed is:

1. A method by a Policy Control Function (PCF) of enabling a Session Management Function (SMF) in a telecommunication network to enforce a Policy and Charging Control (PCC) rule, in relation to a Protocol Data Unit (PDU) session between a User Device and the telecommunication network by providing, by said PCF, in said telecommunication network, Quality-of-Service (QoS) parameters to said SMF for use in said PCC rule, said method comprising:

receiving, by said PCF, service information comprising service QoS requirements and alternative QoS requirements;

mapping, by said PCF, said received service information into QoS parameters and related charging parameters, wherein said QoS and related charging parameters at least comprise:
a QoS profile and a charging profile bound to said QoS profile; and
an alternative QoS profile and an alternative charging profile bound to said alternative QoS profile, wherein said alternative QoS profile and said alternative charging profile is to be used in case of QoS degradation;

providing, by said PCF, to said SMF, said mapped QoS parameters and related charging parameters for enforcing said PCC rule in relation to said PDU session between said User Device and said telecommunication network;

receiving, by said PCF, from said SMF, a notification that QoS targets are not guaranteed, wherein the notification indicates said alternative QoS profile that is guaranteed and said alternative charging profile that is being applied; and notifying, by said PCF to an Application Function (AF), that the QoS targets cannot be guaranteed and indicating, to the AF, alternative service requirements being applied;

wherein said mapping and providing is performed at, or as part of, establishment of the PDU session with the QoS profile, and wherein the notification is received from the SMF during the PDU session based on a Radio Access Network (RAN) part of said telecommunication network detecting QoS degradation that comprises the QoS targets associated with the QoS profile no longer being guaranteed such that the QoS profile can no longer be fulfilled.

2. The method in accordance with claim 1, wherein said mapping comprises:

determining said charging profile for said QoS profile, and determining said alternative charging profile for said alternative QoS profile.

3. The method in accordance with claim 1, wherein said providing further comprises providing, by said PCF, to said SMF, a subscription to a QoS notification control (QNC) report for applying charging according to the alternative charging profile or the charging profile.

4. The method in accordance with claim 1, wherein the alternative charging profile comprises an alternative rating group and at least one set of alternative charging parameters, wherein the at least one set comprises one or more of a charging key, a service identifier, a sponsor identifier, an application service provider identifier, a measurement method, and a service identifier level reporting.

5. The method in accordance with claim 3, wherein the QNC report comprises a first parameter identifier for a parameter from an alternative QoS set of parameters that the telecommunication network can guarantee and a second parameter identifier for a parameter from an alternative charging parameter set that the SMF is enforcing or an indication of a QoS recovery.

6. The method in accordance with claim 1, wherein the PCC rule comprises a reference to a charging data policy decision type for the alternative charging profile and the charging profile, respectively.

7. The method in accordance with claim 1, further comprising:

receiving a first indication from the SMF that the alternative QoS profile and the alternative charging profile are being enforced by the SMF for said protocol data unit (PDU) session; and notifying a third node that the alternative QoS profile are being enforced by the SMF for the PDU session.

8. A method in accordance with claim 7, further comprising:

receiving a second indication that the QoS profile and the charging profile are being enforced by the SMF for the PDU session; and notifying the third node that the QoS profile is being enforced by the SMF for the PDU session.

9. The method of claim 1, wherein the QoS profile, the charging profile bound to said QoS profile, the alternative QoS profile, and the alternative charging profile bound to said alternative QoS profile are included in the same PCC rule at establishment of the PDU session, such that the alternative QoS profile and the alternative charging profile are applied during the PDU session when the QoS profile can no longer be fulfilled, without modifying the PCC rule during the PDU session.

10. The SMF in accordance with claim 9, wherein the memory includes instructions that when executed by the processing circuitry further causes the SMF to, responsive to receiving from the RAN a first notification of the QoS degradation, enforcing the alternative charging profile from the PCC rule corresponding to the alternative QoS profile for charging related to the PDU session.

11. The SMF in accordance with claim 9, wherein the memory includes instructions that when executed by the processing circuitry further causes the SMF to notify the PCF of the alternative charging profile being enforced for a corresponding alternative QoS profile, wherein the notifying includes notifying the PCT of:

an alternative QoS profile identifier that applies for the PCC rule; and/or an alternative charging profile identifier.

12. The SMF in accordance with claim 9, wherein the memory includes instructions that when executed by the processing circuitry further causes the SMF to:

receive, from the RAN, a second notification that the QoS degradation is recovered to the QoS profile corresponding to the charging profile;

responsive to receiving the second notification, enforce the charging profile from the PCC rule; and notify the PCF of the charging profile being enforced for the corresponding QoS profile from the PCC rule.

13. A method of enforcing, by a Session Management Function (SMF) in a telecommunication network, a Policy and Charging Control (PCC) rule, in relation to a Protocol Data Unit (PDU) session between a User Device and the telecommunication network, wherein the method comprises:

receiving, by said SMF, from a Policy Control Function (PCF) in said telecommunication network, Quality-of-Service (QoS) parameters and related charging parameters for enforcing said PCC rule in relation to said PDU session between said User Device and said telecommunication network, wherein said QoS parameters and related charging parameters comprise:

a QoS profile and a charging profile bound to said QoS profile, and an alternative QoS profile and an alternative charging profile bound to said alternative QoS profile, wherein said alternative QoS profile and said alternative charging profile is to be used in case of QoS degradation;

receiving, by said SMF, from a Radio Access Network (RAN), part of said telecommunication network, a notification that QoS targets are not guaranteed but QoS targets of said alternative QoS profile can be used;

enforcing, by said SMF, said alternative QoS profile and said alternative charging profile in case of QoS degradation; and providing, by said SMF, to said PCF, a notification that QoS targets are not guaranteed, wherein the notification indicates said alternative QoS profile that is guaranteed and said alternative charging profile that is being applied;

wherein the QoS parameters and related charging parameters are received at, or as part of, establishment of the PDU session with the QoS profile, and wherein the notification is provided to said PCF during the PDU session based on said RAN part of said telecommunication network detecting QoS degradation that comprises the QoS targets associated with the QoS profile no longer being guaranteed such that the QoS profile can no longer be fulfilled.

14. The method in accordance with claim 13, further comprising, responsive to receiving from the RAN a first notification of the QoS degradation, enforcing the alternative charging profile from the PCC rule corresponding to the alternative QoS profile for charging related to the PDU session.

15. The method in accordance with claim 14, wherein enforcing the alternative charging profile from the PCC rule corresponding to the alternative QoS profile for charging related to the PDU session comprises informing a charging node regarding charging for data of the PDU session using the alternative charging profile.

16. The method in accordance with claim 13, further comprising notifying the PCF of the alternative charging profile being enforced for a corresponding alternative QoS profile, wherein the notifying includes notifying the PCT of:

an alternative QoS profile identifier that applies for the PCC rule; and/or an alternative charging profile identifier.

17. The method in accordance with claim 13, wherein said receiving further comprises receiving a subscription to a QoS notification control (QNC) report for applying charging according to the alternative charging profile or the charging profile.

18. The method in accordance with claim 13, further comprising:

receiving, from the RAN, a second notification that the QoS degradation is recovered to the QoS profile corresponding to the charging profile;

responsive to receiving the second notification, enforcing the charging profile from the PCC rule; and notifying the PCF of the charging profile being enforced for the corresponding QoS profile from the PCC rule.

19. The method in accordance with claim 13, wherein the alternative charging profile comprises an alternative rating group and at least one set of alternative charging parameters, wherein the at least one set comprises one or more of a charging key, a service identifier, a sponsor identifier, an application service provider identifier, a measurement method, and a service identifier level reporting.

20. The method in accordance with claim 13, wherein the PCC rule comprises a reference to a charging data policy decision type for the alternative charging profile and the charging profile, respectively.

21. The method of claim 13, wherein the QoS profile, the charging profile bound to said QoS profile, the alternative QoS profile, and the alternative charging profile bound to said alternative QoS profile are included in the same PCC rule at establishment of the PDU session, such that the alternative QoS profile and the alternative charging profile are applied during the PDU session when the QoS profile can no longer be fulfilled, without modifying the PCC rule during the PDU session.

22. A Policy Control Function (PCF) of a telecommunication network arranged for enabling a Session Management Function (SMF) in the telecommunication network to enforce a Policy and Charging Control (PCC) rule, in relation to a Protocol Data Unit (PDU) session between a User Device and the telecommunication network by providing, by said PCF, Quality-of-Service (QoS) parameters to the SMF for use in the PCC rule, the PCF comprising:

processing circuitry; and memory coupled with the processing circuitry, wherein the memory includes instructions that when executed by the processing circuitry causes the PCF to:

receive service information comprising service QoS requirements and alternative QoS requirements;

map said received service information into QoS parameters and related charging parameters, wherein said QoS and related charging parameters at least comprise:

a QoS profile and a charging profile bound to said QoS profile, and an alternative QoS profile and an alternative charging profile bound to said alternative QoS profile, wherein said alternative QoS profile and said alternative charging profile is to be used in case of QoS degradation;

provide to said SMF, said mapped QoS parameters and related charging parameters for enforcing said PCC rule in relation to said PDU session between said User Device and said telecommunication network;

receive, from said SMF, a notification that QoS targets are not guaranteed and comprises said alternative QoS profile that is guaranteed and said alternative charging profile that is being applied; and notify an Application Function (AF) that the QoS targets cannot be guaranteed and indicate to the AF alternative service requirements being applied;

wherein the processing circuitry causes the PCF to map the received service information into the QoS parameters and related charging parameters, and to provide the mapped QoS parameters and related charging parameters to said SMF, at, or as part of, establishment of the PDU session with the QoS profile, and wherein the processing circuitry causes the PCF to receive the notification from the SMF during the PDU session based on a Radio Access Network (RAN) part of said telecommunication network detecting QoS degradation that comprises the QoS targets associated with the QoS profile no longer being guaranteed such that the QoS profile can no longer be fulfilled.

23. The PCF in accordance with claim 22, wherein the memory includes instructions that when executed by the processing circuitry further causes the PCF to provide, to said SMF, a subscription to a QoS notification control (QNC) report for applying charging according to the alternative charging profile or the charging profile.

24. The PCF in accordance with claim 23, wherein the alternative charging profile comprises an alternative rating group and at least one set of alternative charging parameters, wherein the at least one set comprises one or more of a charging key, a service identifier, a sponsor identifier, an application service provider identifier, a measurement method, and a service identifier level reporting.

25. The PCF in accordance with claim 23, wherein the PCC rule comprises a reference to a charging data policy decision type for the alternative charging profile and the charging profile, respectively.

26. The PCF in accordance with claim 23, wherein the memory includes instructions that when executed by the processing circuitry further causes the PCF to:

receive a first indication from the SMF that the alternative QoS profile and the alternative charging profile are being enforced by the SMF for said protocol data unit (PDU) session; and notify a third node that the alternative QoS profile are being enforced by the SMF for the PDU session.

27. A Session Management Function (SMF) of a telecommunications network arranged for enforcing a Policy and Charging Control (PCC) rule, in relation to a Protocol Data Unit (PDU) session between a User Device and the telecommunication network, the SMF comprising:

processing circuitry; and memory coupled with the processing circuitry, wherein the memory includes instructions that when executed by the processing circuitry causes the PCF to:

receive, from a Policy Control Function (PCF) in said telecommunication network, Quality-of-Service (QoS) parameters and related charging parameters for enforcing said PCC rule in relation to said PDU session between said User Device and said telecommunication network, wherein said QoS parameters and related charging parameters comprise:

a QoS profile and a charging profile bound to said QoS profile, and an alternative QoS profile and an alternative charging profile bound to said alternative QoS profile, wherein said alternative QoS profile and said alternative charging profile is to be used in case of QoS degradation;

receive, from a Radio Access Network (RAN), part of said telecommunication network, a notification that QoS targets are not guaranteed but QoS targets of said alternative QoS profile can be used;

enforce said alternative QoS profile and said alternative charging profile in case of QoS degradation; and provide, to said PCF, a notification that QoS targets are not guaranteed and indicate, to said PCF, said alternative QoS profile that is guaranteed and said alternative charging profile that is being applied;

wherein the processing circuitry causes the SMF to receive the QoS parameters and related charging parameters at, or as part of, establishment of the PDU session with the QoS profile, and wherein the processing circuitry causes the SMF to provide the notification to said PCF during the PDU session based on said RAN part of said telecommunication network detecting QoS degradation that comprises the QoS targets associated with the QoS profile no longer being guaranteed such that the QoS profile can no longer be fulfilled.

* * * * *